SLIDE VALVE
Filed Feb. 23, 1951 2 Sheets-Sheet 1
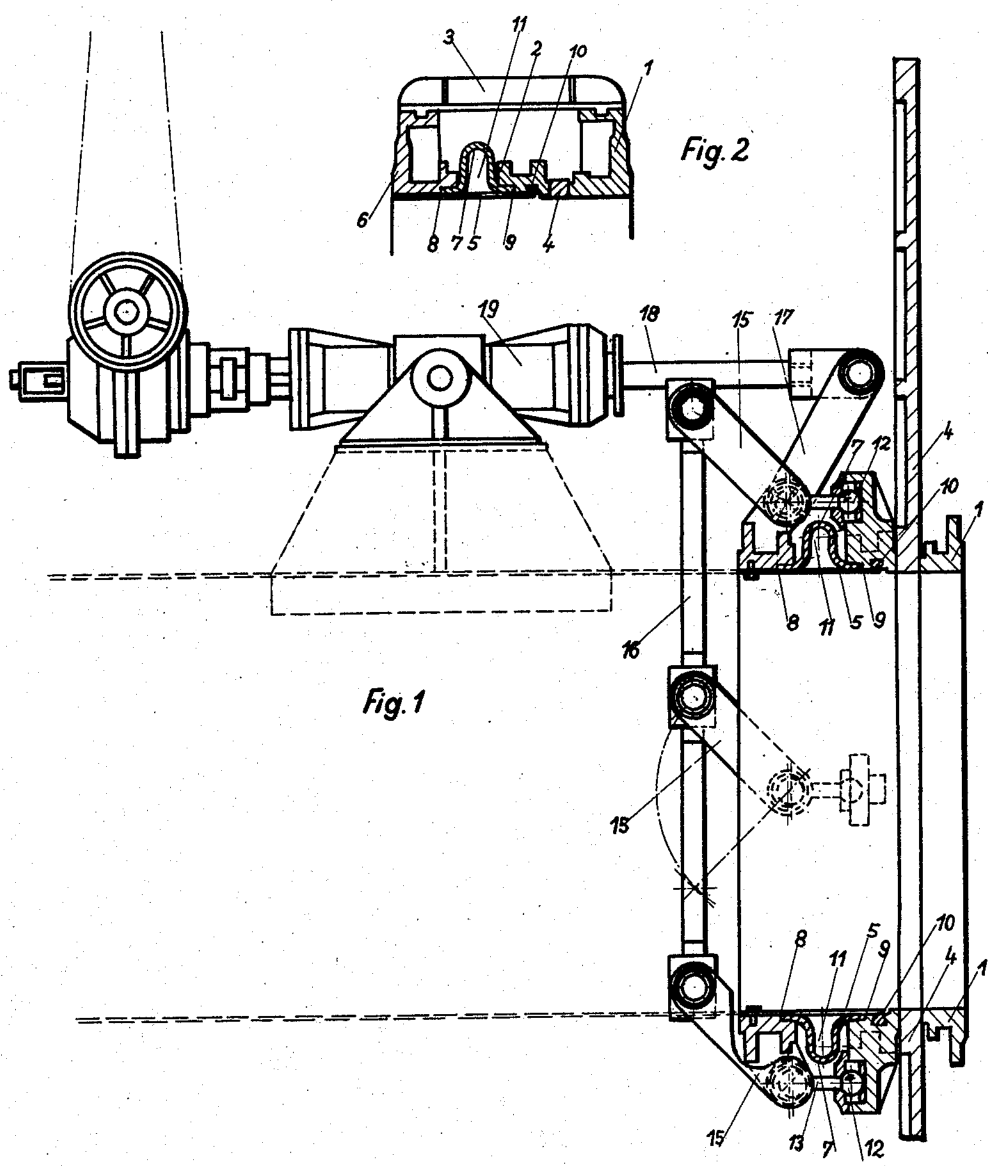
INVENTOR:
Bernhard Scholl,
By E. J. Brennan,
HIS ATTORNEY.

Feb. 15, 1955 B. SCHOLL 2,702,178
SLIDE VALVE
Filed Feb. 23, 1951 2 Sheets-Sheet 2
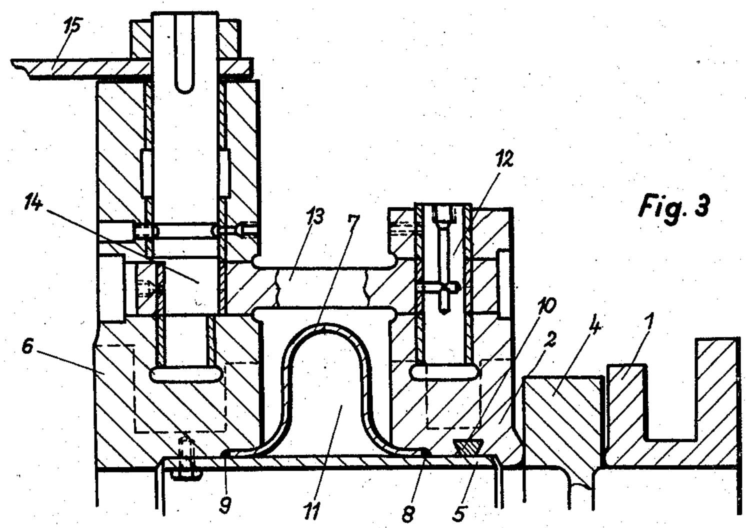
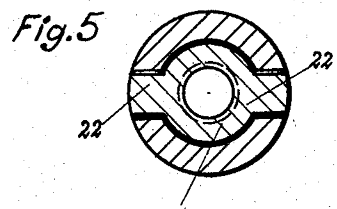
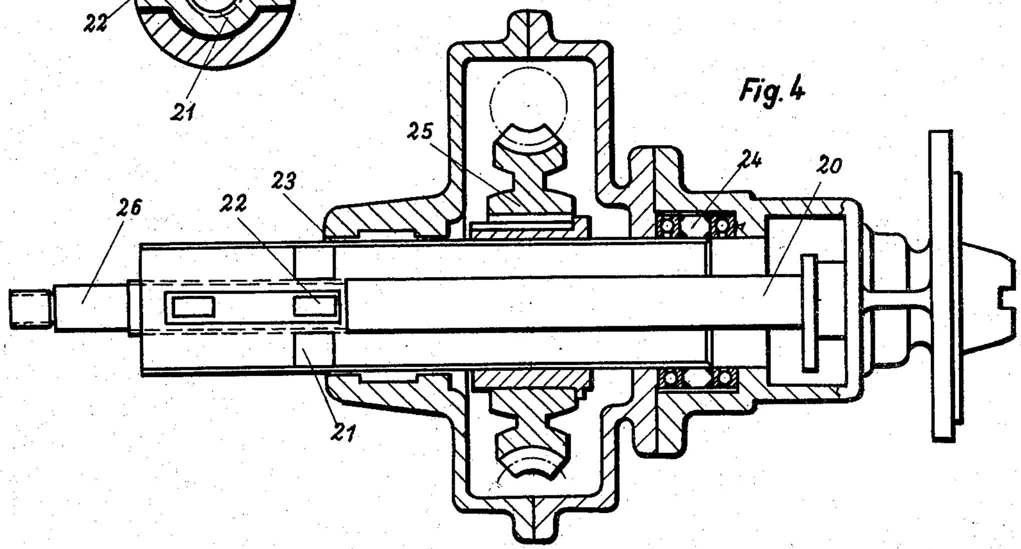
INVENTOR:
Bernhard Scholl,
By [signature]
His Attorney.

United States Patent Office 2,702,178 Patented Feb. 15, 1955

2,702,178

SLIDE VALVE

Bernhard Scholl, Duren, Germany, assignor to Zimmermann & Jansen, Duren, Germany Application February 23, 1951, Serial No. 212,360

Claims priority, application Germany February 27, 1950

6 Claims. (Cl. 251—159)

The invention relates to slide valves for gas and particularly contaminated gas conduits. These contaminations settle on the slide valves, render their operation after short periods extremely difficult or block it entirely.

It is the primary object of the invention to secure a continuous operation of these slide valves, even if their valve disc and its sealing members are packed and pasted with the dust and other impurities of the gases.

In order to comply with this object, one of the two disc sealing members is rendered slidable in the axial direction of the gas conduits; in this manner a satisfactory operation of the valve is always secured and the difficulties resulting from its being blocked by settled gas impurities are eliminated.

Moreover, a mechanism is provided for this displaceable sealing member whereby the same is suspended at several spots of its circumference; this suspension device serves at the same time as a means for the creation of a surface pressure between the displaceable valve sealing member and the valve disc.

After a certain operational period, within which the gas impurities have settled on the valve, one sealing ring is withdrawn from the valve and the latter is hereby freed for its manipulation.

Numerous devices have been designed to meet the requirements with which the invention is concerned and to effect the loosening of the blocked slide valves. For this purpose, the valve sealing rings have been made adjustable by screws, which were operated to produce a pressure between the slidable valve disc and its sealing members. However, the required tight connection between the valve housing and the sealing rings could not be obtained in this manner; the gases were free to escape therebetween whereby the attendants are inaccommodated and injured.

Suggestions have been made to make the valve housing of an elastic material, whereby the sealing rings would follow the deformation of the elastic housing and the valve disc would be loosened simltaneously. However, in this case, a high pressure must be exerted upon the valve housing to sufficiently separate the valve sealing members.

It is an object of the invention to eliminate these grave shortcomings of the known slide valves and to provide a valve construction for gas carrying conduits, which can be easily and safely released after extended periods of use.

It is another object of the invention to provide a gas valve, which will always guarantee a tight closure.

The invention will now be described more in a detail and with reference to the accompanying drawings, showing a preferred embodiment thereof.

In the drawings:

Fig. 1 is a vertical part sectional view of a slide valve applied to a gas conduit in conformity with the invention;

Fig. 2 is a horizontal sectional view on line 2—2 of Fig. 1;

Fig. 3 is a vertical sectional view of the valve seat on an enlarged scale;

Fig. 4 is a longitudinal sectional view of the steering means for the displaceable sealing ring; and Fig. 5 is a vertical, part sectional view on line 5—5 of Fig. 4.

As stated above, it is the primary object of the invention to produce a slide valve for gas conduits which will remain fully operative, not be blocked by the impurities of the gas and will always guarantee a proper operation.

As apparent from the drawings, the valve disc 4 is guided during its vertical displacement by two annular sealing members or sealing rings 1, 2. The one valve member 1 is in the usual manner rigidly connected with the valve housing by means of the reinforcing brackets 3 or the like; the sealing ring may also be made in one piece with the valve housing.

The other annular sealing member or ring 2 is suspended in such a manner as to be shiftable in the axial direction of the conduit, which accommodates the valve and is indicated by dotted lines in Fig. 1.

Since the sealing member 2 is suspended in a manner which will be described more in detail as this specification proceeds, it is not necessary to overcome the large tension which prevails in the valve housing wall during the closure of the valve; it is sufficient to create the required surface pressure at the valve sealing faces.

The axial displacement and the suspension of sealing member 2 enables such an easy operation of the valve slide 4, that it can be easily closed and opened in spite of being clogged by settled impurities.

The free passage of the media flowing through the gas conduits and a support of the movable sealing member 2 is obtained by a tube 5, upon which the sealing ring 2 is axially movable; the tube has a diameter which is only slightly smaller than the cross section of the conduit; it is rigidly connected, for instance, welded or screwed to part 6 of the valve housing.

The tube 5 supports an outwardly bent or outbulging member 7, which has two lateral flanges 8, 9. Flange 8 reaches into the space between the end of tube 5 and part 6 of the valve housing and is solidly connected therewith. Flange 9 projects in the space between the other end of the tube 5 and sealing member 2 and is connected with the latter.

A ring 10, Fig. 3, is provided on ring 5 to guide the sealing member 2 during its displacement on tube 5. If gas escapes between sealing ring 2 and tube 5, it is caught in the inner space 11 of the elastic member 7. From here, the gas cannot escape because it is trapped by the tightly connected parts 5, 6, 8. The space 11 may preferably be filled with glass wool 11.

It is a characterizing element of the invention to suspend the adjustable sealing member 2 by means of a large number of circumferential suspension means 12 in such a manner that its axial displacement or shifting is not impaired; the shifting equipment may simultaneously be so constructed as to exert the required surface pressure at the sealing faces of member 2. By the provision of a large number of these combined pressure and suspension means, a uniform surface pressure is enabled, whereby the slide 4 is properly and firmly held over its entire sealing surface between the sealing members 1 and 2. Since the sealing member 2 is suspended for its axial displacement, it may be for instance connected to a common operating or shifting device by a suitable lever arrangement. This lever arrangement may be controlled by a pressure fluid or a piston actuated machine, by an electric switch or by hand. In this manner, a plurality of slides 4 may be actuated from one distant place.

The suspension members 12 may be operated by bolts 13, the latter being displaced towards the pressure members by excenters 14. The excenters are rotated by levers 15 which are pivotally connected with push rods 16, the latter being axially displaced by lever 17 and piston rod 18.

As apparent from Figs. 1 and 4, piston rod 18 is adjustable by a piston located in cylinder 19; the rod is provided with an extension 20, Fig. 4, enabling its mechanical or manual operation. The extension 20 carries a tapped nut 21 provided with radial wings 22 which enter into longitudinal slots of a rotatably supported tube 23, Fig. 5. Tube 23 is secured against axial displacement by a thrust bearing 24; the tube is driven by a worm gear 25. Nut 21 is operatively connected with a manually actuated spindle 26.

The described mechanism may be operated by a pressure fluid, by mechanical or electrical means or manually.

If hydraulic means are used, the piston is moved by the pressure fluid; accordingly, the unit 21 is displaced by means of wings 22 in axial slots of tube 23 which is rotated by worm gear 25.

If the worm gear 25 is operated by mechanical means or manually, the tube 23 is rotated. Also in this case, the nut 21 is rotated by wings 22. The nut 21 is axially displaced due to its connection with the stationary spindle 26; the piston rod is entrained and the push rod 16 is actuated.

Since certain changes may be made in the above article and different embodiments of the invention could be made without departing from the scope thereof, it is intended that all matter contained in the above description or shown in the accompanying drawing shall be interpreted as illustrative and not in a limiting sense.

What I claim as new and desire to be secured by Letters Patent, is as follows:

1. In a slide valve equipment for a circular gas conduit a valve casing, a vertically movable valve disc, an annular disc sealing member located at each side of said valve disc for a mutual sealing cooperation, said disc sealing member being solidly connected to said valve casing, the second disc sealing member being movably suspended in the axial direction of the conduit, an inner tubular member adjacently located to said conduit secured at the one end to said valve casing and extending with the other end into said conduit to support said movable sealing member during its axial displacement and a tube provided with an outwardly bent center bulge tightly surrounding said inner tubular member and being connected at one of its lateral edges with the valve casing and at the opposite edge with said displaceable valve member.

2. In a slide valve equipment according to claim 1, said outwardly bent tube being made of a resilient material and having at least one flanged edge to effect a tight closure with the displaceable valve member.

3. In a slide valve equipment for a circular gas conduit a valve casing, a vertically movable valve disc, an annular disc sealing member located at each side of said valve disc for a mutual sealing cooperation, said disc sealing member being solidly connected to said valve casing, the second disc sealing member being movably suspended in the axial direction of the conduit, an inner tubular member adjacently located to said conduit secured at the one end to said valve casing and extending with the other end into said conduit to support said movable sealing member during its axial displacement and a tube provided with an outwardly bent center bulge tightly surrounding said inner tubular member being connected at one of its lateral edges with the valve casing and at the opposite edge with said displaceable valve member and a plurality of suspension members secured to the circumference of said movable disc sealing member.

4. In a slide valve equipment for a circular gas conduit a valve casing, a vertically movable valve disc, an annular disc sealing member located at each side of said valve disc for a mutual sealing cooperation, said disc sealing member being solidly connected to said valve casing, the second disc sealing member being movably suspended in the axial direction of the conduit, an inner tubular member adjacently located to said conduit secured at one end to said valve casing and extending with the other end into said conduit to support said movable sealing member during its axial displacement and a tube provided with an outwardly bent center bulge tightly surrounding said inner tubular member and being connected at one of its lateral edges with the valve casing and at the opposite edge with said displaceable valve member, a shifter device operatively connected to said suspension members to displace the movable disc sealing member and to tightly press the same towards said valve disc.

5. In a slide valve equipment according to claim 1, a resilient ring sealingly enclosing said tube and opening inwardly out towards the same and, abutting against a stationary and said axially movable disc sealing member.

6. In a slide valve equipment according to claim 5, said resilient ring having bent-over rim portions, the one rim portion being connected with said movable disc sealing member and the other rim portion being connected with a stationary disc sealing member.

References Cited in the file of this patent

UNITED STATES PATENTS

| | | |
|---|---|---|
| 1,727,628 | Baker | Sept. 10, 1929 |
| 1,951,677 | Rosner | Mar. 20, 1934 |
| 2,203,989 | Hamer | June 11, 1940 |
| 2,229,165 | Bowland | Jan. 21, 1941 |

FOREIGN PATENTS

| | | |
|---|---|---|
| 629,628 | Germany | 1936 |